United States Patent [19]

Gross et al.

[11] 4,057,397

[45] Nov. 8, 1977

[54] SYSTEM FOR REGENERATING FLUIDIZABLE CATALYST PARTICLES

[75] Inventors: Benjamin Gross, Cherry Hill; Hartley Owen, Belle Mead, both of N.J.

[73] Assignee: Mobil Oil Corporation, New York, N.Y.

[21] Appl. No.: 665,149

[22] Filed: Mar. 8, 1976

Related U.S. Application Data

[62] Division of Ser. No. 380,173, July 18, 1973.

[51] Int. Cl.² .............................................. B01J 8/24
[52] U.S. Cl. .............................. 23/288 B; 23/288 S; 252/417; 208/120; 208/164
[58] Field of Search ........................ 23/288 B, 288 S; 252/417; 208/120, 164

[56] References Cited

U.S. PATENT DOCUMENTS

| | | | |
|---|---|---|---|
| 3,821,103 | 6/1974 | Owen et al. | 252/417 |
| 3,844,973 | 10/1974 | Stine et al. | 208/164 X |
| 3,886,060 | 5/1975 | Owen | 252/417 |
| 3,888,762 | 6/1975 | Gerhold | 23/288S |
| 3,926,778 | 12/1975 | Owen et al. | 252/417 |

Primary Examiner—James H. Tayman, Jr.
Attorney, Agent, or Firm—Charles A. Huggett; Carl D. Farnsworth

[57] ABSTRACT

A hydrocarbon conversion-catalyst regeneration riser means system with interconnecting standpipes is described which relies upon catalyst separating and collecting vessels about the upper end of each riser means, means for contacting collected catalyst with gaseous material, standpipe means for passing collected catalyst in each vessel means to the lower portion of each riser means opposite from that from which obtained, a standpipe for passing collected regenerated catalyst directly to a lower bottom portion of said regeneration riser means and another standpipe for passing collected regenerated catalyst into the standpipe passing spent catalyst to the lower portion of the regeneration riser.

5 Claims, 2 Drawing Figures

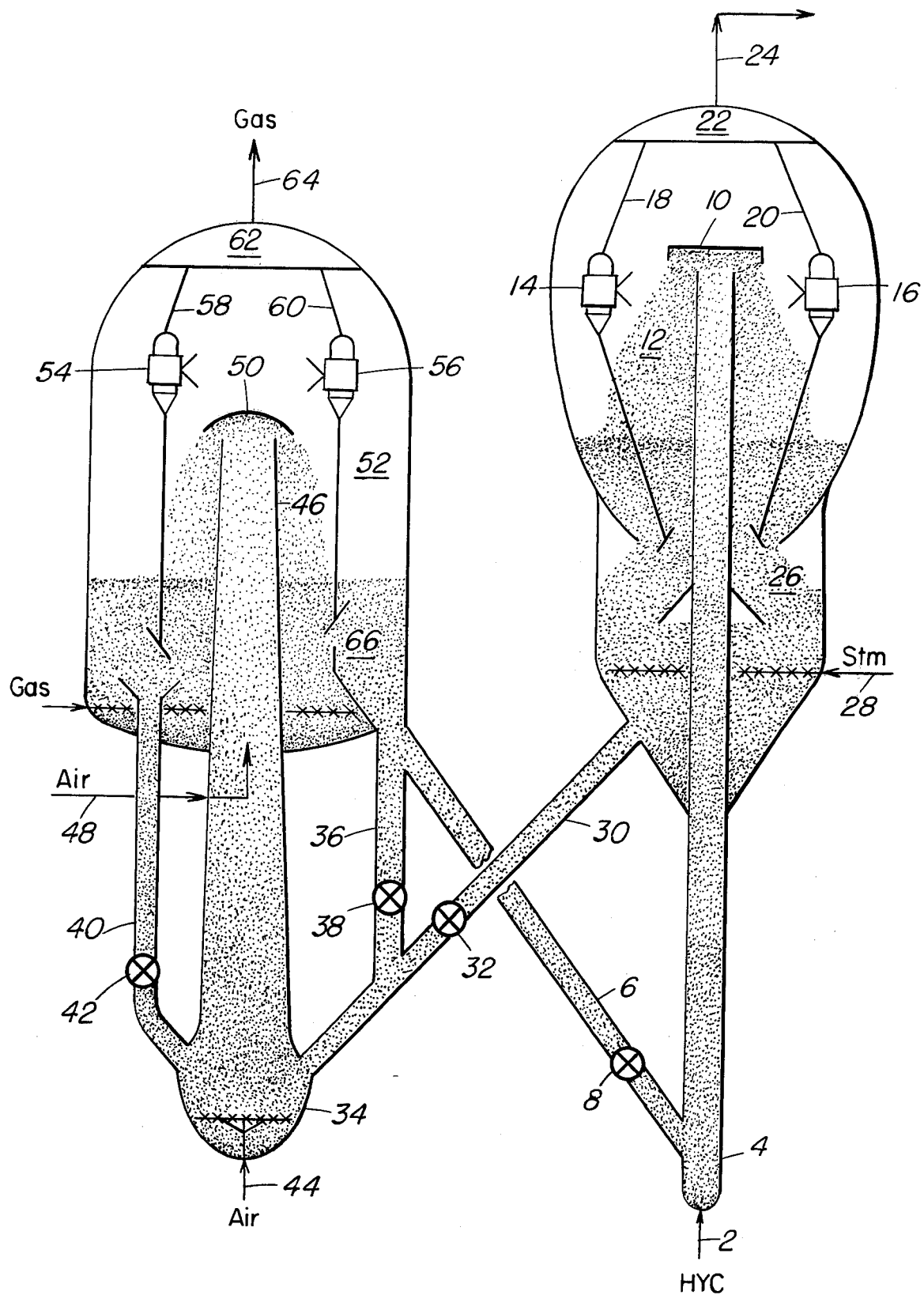
FIGURE I

FIGURE II
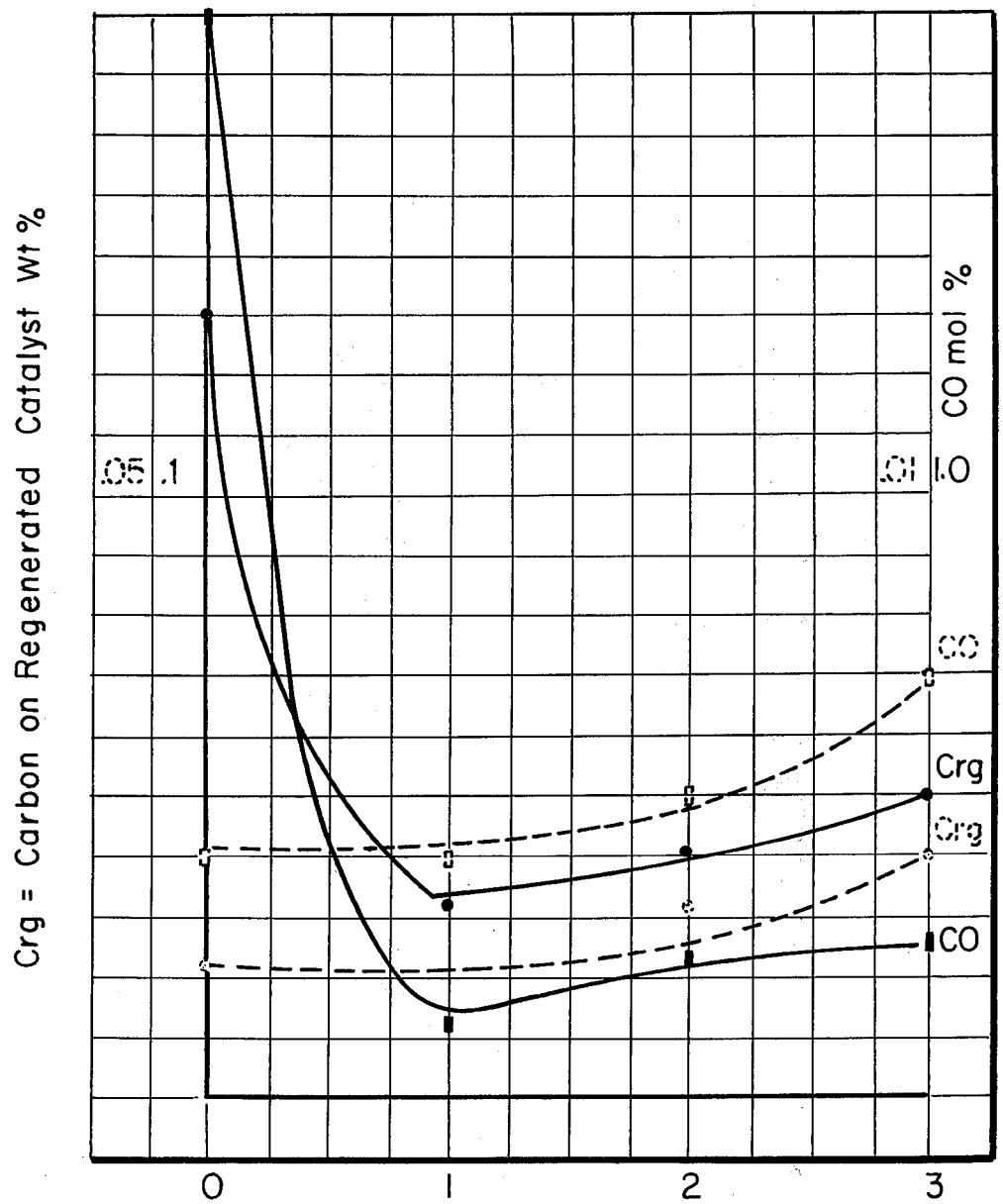

SYSTEM FOR REGENERATING FLUIDIZABLE CATALYST PARTICLES

This application is a division of application Ser. No. 380,173, filed July 18, 1973.

BACKGROUND OF THE INVENTION

The field of catalytic cracking and particularly fluid catalyst operations have undergone significant development improvements due primarily to advances in catalyst technology and product distribution obtained therefrom. With the advent of high activity catalyst and particularly crystalline zeolite cracking catalysts new areas of operating technology have been encountered requiring even further refinements in processing techniques to take advantage of the high catalyst activity, selectivity and operating sensitivity. The present invention therefore is concerned with a combination operation comprising hydrocarbon conversion and regeneration of the catalyst employed therein. In a particular aspect the present invention is concerned with the technique of regenerating a hydrocarbon conversion catalyst containing deactivating deposits of carbonaceous material.

SUMMARY OF THE INVENTION

The present invention relates to the conversion of hydrocarbon feed materials in the presence of high activity fluidizable catalyst particles and the regeneration of the catalyst particles. In a more particular aspect the present invention is concerned with the method and system for regenerating fluidizable catalyst particles and particularly crystalline zeolite cracking catalyst under highly efficient regenerating conditions promoting the recovery of heat available through the burning of carbonaceous deposits of a hydrocarbon conversion operation. In yet another aspect, the invention is concerned with a particular relationship of operating parameters coupled in a manner promoting suspended catalyst phase removal of deactivating deposits of carbonaceous material from high activity hydrocarbon conversion catalyst particles and heating thereof to an elevated temperature.

In one aspect of the hydrocarbon conversion-catalyst regeneration system of the present invention, a dense fluid catalyst bed regeneration zone in open communication with an upflowing riser regeneration zone thereabove housing upflowing suspended catalyst particles is employed for effecting high temperature regeneration of catalyst particles which are then transferred in part to an adjacent riser hydrocarbon conversion zone wherein at a temperature of at least about 1000° F., conversion of a hydrocarbon feed such as a gas oil feed with a cracking catalyst suspended therein is accomplished. The catalyst employed is preferably a crystalline zeolite high activity catalyst of fluidizable particle size which is transferred in suspended phase condition through the riser conversion zone for a hydrocarbon residence time in the range of 0.5 to about 10 seconds and more usually less than about 8 seconds before separating gasiform or vaporous hydrocarbon materials comprising hydrocarbon conversion products from suspended catalyst as by cyclonic separation means. During the hydrocarbon conversion step, carbonaceous deposits accumulate on the catalyst particles and the particles entrain hydrocarbon vapors from the catalyst separation step which are thereafter normally removed with stripping gas in a separate catalyst stripping zone. Hydrocarbon conversion products separated from catalyst and stripping gasiform materials are then combined and passed to a product fractionation step. Stripped catalyst containing deactivating amounts of carbonaceous material often referred to as coke is then passed to catalyst regeneration.

The regeneration technique and system of the present invention is unique in many respects for accomplishing the efficient removal of carbonaceous material or coke deposits on the catalyst particles and the recovery of heat available through such a coke removal operation. The regeneration technique of this invention relies upon a particular dense fluid bed operation superimposed by an upflowing dispersed, suspended catalyst phase operation of limited particle density and high temperature profile in which the density of catalyst particle in regeneration gas in the dense fluid catalyst bed is as high as 40 lbs/cu.ft. and the particles density in the upflowing dispersed catalyst phase is over a range decreasing down to about 8 lbs/cu.ft. and preferably to about 1.5 lbs/cu.ft. The regeneration gas velocity is preferably at least 3 ft./sec. to obtain desired dispersed phase catalyst flow through the regeneration. The high temperature profile of the suspended catalyst regeneration operation is initially promoted by the mixing of hot regenerated catalyst with the coke deactivated catalyst to provide an initial catalyst dense bed mix temperature of at least 1175° F. and preferably about 1200° F. so that upon initial contact with oxygen containing regeneration gas such as air combustion of carbonaceous deposits is rapidly promoted. Thus, in the system of the present invention all or part of the required amount of hot regenerated catalyst is mixed with coke deactivated catalyst in either the spent catalyst standpipe or bed of catalyst to provide a desired elevated mix temperature into the bottom portion of the riser regeneration zone housing the dense fluid bed of catalyst being regenerated from which the catalyst is moved upwardly suspended in regeneration gas. Additional hot regenerated catalyst may be added to the dense bed of catalyst by a separate standpipe arranged to discharge into a lower portion of the dense fluid bed of catalyst in the regeneration zone to provide the desired catalyst mix temperature of at least 1175° to 1200° F. in the event that only a portion thereof is added to the spent catalyst in the spent catalyst standpipe. On the other hand, mixing of coke contaminated catalyst and hot regenerated catalyst may first occur in a lower portion of the regeneration zone containing the most dense bed of fluidized catalyst particles before upflow therefrom suspended in oxygen containing gases. Provision is also made for adding supplemental oxygen containing regeneration gas to one or more upper portions of the riser regeneration zone to promote the conversion of CO to $CO_2$. In this arrangement, it has been found that a high particles density in the upflowing dispersed catalyst phase tends to quench the conversion of CO to $CO_2$ even at dispersed phase temperatures of at least 1250° F. However, maintaining a low particle density in the suspended catalyst phase below about 5 lbs/cu.ft. permits a partial burn of the CO present which is thereafter completed in the enlarged settling section under lower catalyst particle density conditions.

The riser regeneration zone or regeneration vessel may take on substantially any shape, cylindrical, tapered or shaped as shown in the drawing or combination thereof which will provide the restricted operating parameters of the invention as herein defined.

The regenerating technique and system of this invention relies upon an initial high temperature dense fluid catalyst bed undergoing coke burning conditions accompanied by a dispersed catalyst phase withdrawal overhead therefrom wherein the conversion of formed CO to $CO_2$ is promoted and the recovery of heat thus generated is absorbed by catalyst particles dispersed therein so that the combustion gas-catalyst particle suspension discharged from the upper end of the suspended dispersed catalyst phase regeneration zone will have reached a temperature of at least about 1350° F. In such a system the primary oxygen containing regeneration gas stream is introduced to the bottom portion of an enlarged bed of catalyst in the bottom of the regeneration zone and secondary regeneration gas is preferably introduced to an upper more restricted cross sectional area of the dispersed phase regeneration section as required in one or more downstream regeneration gas inlets to promote a more complete conversion of coke deposits and CO to $CO_2$. Preheating of the primary regenerated gas stream is desirable and more usually practiced with low coke producing catalyst conversion systems so that an initial catalyst mix temperature of at least 1175° F. in the dense fluid bed of catalyst will be more easily attained.

The regenerating technique of the present invention relies upon a particular and considerably restricted relationship of operating parameters which will accomplish the removal of carbonaceous deposits down to at least 0.05 weight percent and preferably as low as about 0.03 weight percent in combination with limiting the amount of carbon monoxide in the combustion flue gases not to exceed about 0.15 mole percent. Thus it is essential to the processing concepts of this invention to initiate dense catalyst bed burning of deposited carbonaceous material at an elevated temperature of at least about 1175° F. obtained by mixing spent catalyst with regenerated catalyst with an amount of oxygen containing regenerating gas providing a dense bed catalyst temperature rise of at least about 100° and preferably sufficient to heat the catalyst particles carried overhead from the bed of catalyst to an elevated temperature of at least 1300° F. Furthermore, to reap the advantage of the heat generated in the system, the regeneration gas flow rate is restricted to maintain a density of catalyst particles in the bottom portion of the regeneration zone within the range of 35 to 40 lbs/cu.ft. and in the upper more dispersed catalyst phase region of the suspended catalyst regeneration zone adjacent the discharge therefrom at a density of catalyst particles as low as about 5 lbs/cu.ft. and preferably not above about 3 lbs/cu.ft.

It will be recognized from the above discussion that a delicate balance in operating parameters must be maintained to obtain a desired coke burning and removal thereof without producing undesired oxygen and carbon monoxide concentrations in the combustion flue gases and these operating restrictions are dictated in substantial measure by the ratio of hot regenerated catalyst that can be mixed with spent catalyst obtained from hydrocarbon conversion. Thus it will be observed from the data presented herein and shown in FIG. II, that to high a mix ratio is undesirable for producing regenerated catalyst particles at a temperature of about 1400 because of insufficient coke burning and to low a mix ratio does not accomplish the desired coke burn and removal within the limits of the system. Low initial catalyst mix temperatures or much greater than 1 to 1 regenerated catalyst to spent catalyst mix ratios are accompanied by high concentrations of carbon monoxide and oxygen in the combustion flue gases it has been observed.

BRIEF DESCRIPTION OF THE DRAWINGS

FIG. I presents diagrammatically in elevation one arrangement of apparatus for accomplishing the riser catalytic conversion of hydrocarbons and the regeneration of catalyst particles initially with a mixture of regeneration and spent catalyst in a dense fluid bed of catalyst followed by a dispersed catalyst regeneration phase before separation of flue gases from regenerated catalyst particles of desired CO content.

FIG. II is a plot of the data presented in Tables I and II.

DISCUSSION OF SPECIFIC EMBODIMENT

Referring now to the drawing, FIG. 1, a hydrocarbon feed such as a gas oil boiling range feed is introduced by conduit 2 to the bottom of a riser conversion zone 4. Hot regenerated catalyst in conduit 6 provided with flow control valve 8 enters the bottom portion of riser 4 for admixture with the oil feed to form a catalyst-oil suspension at an elevated conversion temperature of at least about 950° F. and more usually at least 1000° F. The suspension is passed upwardly through the riser conversion zone under hydrocarbon conversion conditions promoting the cracking of the gas oil feed to produce carbonaceous deposits on the catalyst products and lower boiling products including gasoline, fuel oils and normally gaseous hydrocarbon products. The hydrocarbon feed with suspended catalyst particles is usually maintained in the riser conversion zone for a hydrocarbon residence time in the range of 4 to 10 seconds, however shorter hydrocarbon residence time in the range of 0.5 to 4 seconds may also be employed particularly when using hydrocarbon conversion temperatures up to about 1100° F. The suspension is discharged from the upper open end of the riser conversion zone against a deflector baffle 10 as shown or it may be passed directly into cyclonic separation means about the end of the riser reactor. In the arrangement of the drawing the suspension discharged from the riser is deflected outwardly into an enlarged separation zone 12 causing a drop in the suspension velocity which promotes the separation of catalyst particles by settling from gasiform material comprising hydrocarbon conversion products. Hydrocarbon vapors or gasiform material with a reduced amount of suspended catalyst particles pass into separators 14 and 16 wherein a cyclonic separation of entrained catalyst particles from gasiform hydrocarbon product material is accomplished. Of course cyclone separators 14 and 16 may each be a plurality of cyclonic separation means suitably connected to accomplish the results desired. Gasiform hydrocarbon material and stripping gas obtained as provided below is withdrawn by conduits 18 and 20 communicating with plenum chamber 22 and withdrawal conduit 24. Conduit 24 communicates with product separation equipment not shown. Catalyst particles separated by the velocity reduction above discussed and by cyclonic means is collected as a bed of catalyst 26 which moves downwardly through a stripping vessel and countercurrent to rising stripping gas such as steam introduced by conduit 28. The stripping gas maintains the bed of catalyst 26 in a fluid condition and removes entrained hydrocarbon vapors and other strippable material from the catalyst as it moves downwardly through the stripping zone. Stripped catalyst is withdrawn by standpipe 30 provided with flow control valve 32 and passed to the bottom portion of a regeneration zone 34 shown to be bulb-shaped in the drawing and housing a dense fluid bed of catalyst to be regenerated as herein provided. Regenerated catalyst obtained as hereinafter defined and withdrawn by standpipe 36 provided with flow control valve 38 communicates with standpipe or conduit 30 and permits the mixing of hot regenerated catalyst at a temperature of at least 1300° F. with the spent catalyst in conduit 30 at a temperature in the range of about 900° F. up to about 960° F.

In the enlarged bulb portion of the regenerator a dense bed of catalyst comprising a mixture of coke contaminated catalyst and hot freshly regenerated catalyst particles passed and obtained through the regeneration sequence of this invention are mixed to provide a catalyst bed temperature of at least about 1175° F. Additional regenerated catalyst may be added by standpipe 40 provided with flow control valve 42 to the enlarged bulb portion 34 of the regenerator to assist with providing a desired mix temperature. In the bottom bulb portion of the regenerator, a relatively large dense fluid bed of catalyst particles is formed providing a mixture temperature of at least 1175° F. and a density of catalyst particles within the range of 35 to 40 lb/cu.ft. A regeneration gas distributor grid is provided in the bottom portion of the dense fluid catalyst bed to which the primary regeneration gas stream is fed by conduit 44. Heating of the regeneration gas or air stream introduced by conduit 44 is preferred in view of the delicate balance in operating parameters required by the invention. Thus with a spent catalyst temperature of about 960° F. and containing 0.9 wt.% carbon thereon, it is desirable to preheat the regeneration gas to about 325° F. and use a 1 to 1 ratio of spent catalyst to recycle regenerated catalyst at a temperature of about 1400° F. In the dense fluid bed of catalyst particles, the temperature of the bed is caused to be elevated by the burning of carbonaceous material with introduced oxygen containing regeneration gas. Furthermore, combustion of carbonaceous material is rapidly initiated by the hot catalyst mix so that catalyst particles carried overhead by hot oxygen containing combustion gases will complete the removal of carbonaceous deposits, transform carbon monoxide to carbon dioxide and produce a less dense catalyst combustion gas suspension temperature of at least 1350° F. and preferably at least about 1390° F. As mentioned above, the density of particles in the upwardly flowing suspension is decreased in the direction of flow to at least 5 lbs/cu.ft. and preferably it is reduced to 3 lbs/cu.ft. before discharge from the riser into the enlarged separation zone. In any event the suspended catalyst phase in the enlarged settling zone will be less than 3 lbs/cu.ft.

The regenerated catalyst suspension is discharged from the open upper end of riser regenerator 46 extending above bulb portion 34. Additional oxygen containing gas such as air may be added by one or more spaced inlets represented by conduit 48 to downstream portions of suspended catalyst phase regeneration zone. The catalyst-combustion gas suspension passed upwardly through the restricted cross-sectional regeneration zone or riser 46 discharges against baffle 50 which deflects the suspension outwardly into an enlarged settling zone 52 thereby substantially lowering the velocity of the suspension and causing the catalyst particles to settle out. In settling zone 52 a major portion of the catalyst particles separates from the combustion flue gases by a reduction in gas velocity before the flue gases pass through a plurality of cyclone separators represented by separators 54 and 56. Combustion flue gases are removed from separators 54 and 56 by conduits 58 and 60, plenum chamber 62 and withdrawal conduit 64.

Catalyst particles separated as above identified are collected as an annular dense fluid bed of catalyst 66 about the upper end of riser 46 at an elevated temperature up to about 1400° F. from which regenerated catalyst is withdrawn by standpipes 6, 36 and 40 as herein discussed.

The catalyst regeneration method and system of the present invention is unique over that of the known prior art by the limited mixing of hot regenerated catalyst without cooling thereof with coke contaminated catalyst in an amount sufficient to provide an elevated mix temperature of at least 1175° F. This high mix temperature is sufficient for promoting the combustion of carbonaceous deposits and the conversion of formed carbon monoxide to carbon dioxide on a once through basis in a suspended catalyst atmosphere varying in particle density from about 40 lb/cu.ft. down to about 3 lbs/cu.ft. and less.

The catalyst regeneration technique of the present invention particularly relies upon the relatively narrow limits of mix ratios comprising hot regenerated catalyst at a temperature of at least 1350° F. mixed with spent catalyst to obtain a catalyst mixture of at least 1175° F. and the mixture thus formed comprising sufficient carbonaceous material deposits to raise the temperature of the catalyst mixture through combustion up to at least 1350° F. by burning when contacted with oxygen containing regeneration gases. Elevating the temperature of the regenerated catalyst up to 1380° and 1400° F. is particularly preferred.

The essence of the catalyst regeneration concept and method of operation above described was confirmed by analysis of commercial data and a series of calculations based on the conditions presented below.

| A fixed piece of equipment - adiabatic in operation | |
|---|---|
| Dense phase volume | 5,600 cu. ft. |
| Dilute phase volume | 14,000 cu. ft. |
| Spent Catalyst | |
| Circulation | 60 tons/minute |
| Carbon Content | 0.90 wt. % |
| Catalyst Inlet Temperature | 960° F |
| Total Hold Up | 120 tons (80% in dense bed, 20% in riser) |
| Catalyst Residence time in the dense catalyst bed and riser 2 minutes (with no recycle) | |
| Regenerator Air | |
| Low Rate | 906,000 lb/hr |
| High Rate | 1,120,000 lb/hr |
| Inlet Air Temperature | 325° F. |

The calculations made assume uniform mixing of catalyst particles and a slow carbon burning rate proportional to the average concentration of carbon on the catalyst in the dense bed. The burning of CO to $CO_2$ proceeds at a slow rate in the dense fluidized bed. The rate of this reaction is much higher in the gas phase in the absence of catalyst. The calculations were made with two assumptions for the rate of CO reaction in the riser:

1. the homogeneous gas phase rate,
2. a rate 10% of the homogeneous gas phase rate.

For rapid, homogeneous carbon monoxide burning in the gas phase the temperature must be above 1250° F.

One series of calculations not provided herein was made with a low air rate. This was operable with undesired residual coke on regenerated catalyst and high CO in the flue gas and as soon as regenerated catalyst recycle was practiced, temperatures rose, carbon burned increased, but the CO content of the flue gas also increased beyond desired limits because of insufficient air, and also the flue gas contained zero oxygen. This type operation is considered undesirable because of the high concentration of CO in the flue gases.

A more meaningful operation supplies enough oxygen to burn the carbon to $CO_2$. Table I below reports the data obtained assuming homogeneous CO burning in the riser and high air rates.

TABLE I
(High Air Rate - Homogeneous CO Burning in Riser)

| Recycle Ratio | Temperature, ° F. | | | Carbon on Regen. Cat., wt.% | | Gas Out, mol.% | |
|---|---|---|---|---|---|---|---|
| | Cat Mix to Regenerator | Top of Dense Bed | Top of Riser | Top Dense Bed | Top Riser | CO | $O_2$ |
| 0   | 960  | 1172 | 1404 | 0.21  | 0.011 | .004  | 2.42 |
| 1.0 | 1180 | 1291 | 1400 | 0.06  | 0.01  | 0.004 | 2.7  |
| 2.0 | 1243 | 1321 | 1393 | 0.044 | 0.016 | 0.005 | 2.4  |
| 3.0 | 1271 | 1330 | 1383 | 0.040 | 0.020 | .007  | 2.47 |

Table II below is yet a further variation in which a high air was used and the CO burning rate was assumed to be only 10% of the homogeneous CO burning rate.

In this series 30% of the spent catalyst mixed with catalyst carried overhead from the dense bed and thereafter rose through the riser. 70% was mixed with regenerated catalyst in the dense bed.

TABLE II
(High Air Rate, CO burning rate 10% of homogeneous)

| Recycle Ratio | Temperature, ° F. | | | Carbon on Regen. Cat., wt.% | | Gas Out. mol.% | |
|---|---|---|---|---|---|---|---|
| | Cat. Mix to Regenerator | Top of Dense Bed | Top of Riser | Top Dense Bed | Top Riser | CO | $O_2$ |
| 0 | 960  | 1129 | 1323 | 0.221 | 0.131 | 1.81 | 5.0  |
| 1 | 1222 | 1298 | 1410 | 0.037 | 0.032 | 0.12 | 2.2  |
| 2 | 1252 | 1301 | 1360 | 0.036 | 0.04  | 0.22 | 3.1  |
| 3 | 1269 | 1305 | 1350 | .034  | 0.049 | 0.25 | 3.48 |

It will be observed from the above data and the plot of FIG. II that the lowest coke level on regenerated catalyst is obtained at a recycle ratio of 1 and that the corresponding CO level at the top of the riser is low enough to avoid significant afterburning.

Review of the data and FIG. II indicate that the following operating parameters are desirable:

A regenerated catalyst recycle ratio of 0.5 to 2.0 and preferably 0.8 to 1.5 is preferable.

A dense catalyst bed outlet regeneration temperature above 1250° F. is particularly desirable and a temperature of 1280° F. is even more preferable.

The catalyst discharged from the riser should be at least 1350° F.

Residual carbon on regenerated catalyst < 0.05%.

CO content of flue gas out of riser less than 0.2 mole percent, and preferably less than 0.1 mol percent.

The data above presented and presented in FIG. II shows that the recycle ratio of regenerated catalyst to spent catalyst passed through an optimum at about 1.

To limit quenching the conversion of CO to $CO_2$ with regenerated catalyst particles in the riser, the suspension temperature should be at least 1300° F. and the catalyst particles density in the combustion flue gas should be less than 5 lbs/cu.ft. and preferably less than 3 lbs/cu.ft.

We claim:
1. An apparatus for regenerating catalyst particles deactivated with carbonaceous material which comprises,
    a. a first upwardly extending elongated catalyst contact chamber of larger diameter in a lower bottom portion thereof than in the upper major portion thereof,
    b. the upper end of said first elongated contact chamber in open communication with cyclonic separation means,
    c. an upper portion of said elongated contact chamber and cyclonic separation means housed within a separate enlarged second chamber,
    d. said cyclonic separation means in open communication with outlet conduit means extending from a top portion of said second chamber,
    e. a first open ended conduit means in open communication with a lower portion of said second chamber and the lower larger diameter portion of said first catalyst contact chamber,
    f. a second conduit means for passing deactivated catalyst particles to the lower larger diameter portion of said first catalyst contact chamber,
    g. a third open ended conduit means in extending directly between a lower portion of said second chamber and said second conduit means,
    h. valve flow control means in each of said first, second and third conduit means,
    i. means for separately introducing gaseous material to a lower bottom portion of each of said first and second chambers and
    j. conduit means for withdrawing regenerated catalyst particles from a lower portion of said second chamber for transfer to a hydrocarbon conversion chamber.

2. The apparatus of claim 1 wherein flow control valve means are provided in the first, second and third conduit means.

3. The apparatus of claim 1 wherein the regeneration means is tapered generally inwardly in an upward direction.

4. An apparatus combination for effecting the fluid catalyst conversion of hydrocarbons and regeneration of the catalyst comprising
 a. a first upwardly extending riser hydrocarbon conversion conduit means discharging into an upper portion of a first enlarged chamber means,
 b. cyclonic separating means positioned in an upper portion of said first enlarged chamber means and communicating with a gasiform withdrawal conduit means extending from an upper portion of said first enlarged chamber,
 c. means for collecting a mass catalyst discharged from said first riser conduit means in a lower portion of said first chamber,
 d. conduit means for introducing stripping gas into a lower portion of said collected mass of catalyst,
 e. a second upwardly extending riser catalyst regeneration conduit means of larger diameter in a lower portion than in an upper portion thereof,
 f. said second riser conduit means discharging into an upper portion of a second enlarged chamber means,
 g. cyclonic separating means positioned in an upper portion of said second enlarged chamber and communicating with a gasiform withdrawal conduit extending from an upper portion of said second enlarged chamber,
 h. a first open end standpipe means communicating directly between the lower portion of said second enlarged chamber and the lower larger diameter portion of said second riser conduit means,
 i. a second open end standpipe means communicating directly between a bottom portion of said first enlarged chamber and the lower larger diameter portion of said second riser conduit means,
 j. a third open end standpipe means communicating directly between the lower portion of said second enlarged chamber means and a lower portion of said second standpipe,
 k. a fourth standpipe means communicating directly between a lower portion of said second enlarged chamber and a bottom portion of said first riser conduit,
 l. conduit means for introducing hydrocarbon material to a bottom portion of said first riser conduit,
 m. conduit means for introducing regeneration gas to a bottom portion of said second riser conduit, and
 n. valve flow control means in each of said standpipes to control the flow of particles of catalyst through said standpipes.

5. Apparatus for the conversion of hydrocarbons with fluid catalyst particles and regeneration of the fluid catalyst particles comprising in combination,
 a. a first riser conduit discharging into a first enlarged chamber about the upper end thereof, cyclone separating means in an upper portion of said first chamber connected to hydrocarbon material withdrawal conduit means extending from an upper portion of said first chamber, conduit means for introducing stripping gas to a lower portion of said first chamber, conduit means for introducing a hydrocarbon fluid to a bottom portion of said first riser conduit,
 b. a second riser conduit discharging into a second enlarged chamber about the upper end thereof, cyclone separating means in an upper portion of said second chamber connected to regeneration flue gas withdrawal conduit means extending from an upper portion of said second chamber, conduit means for introducing oxygen containing gaseous material to a bottom portion of said second riser conduit,
 c. a first open end standpipe extending from a lower portion of said second chamber to a bottom portion of said second riser conduit,
 d. a second open end standpipe extending between a lower portion of said second chamber and a bottom portion of said first riser conduit,
 e. a third open end standpipe extending between a lower portion of said first chamber and a bottom portion of said second riser conduit,
 f. a fourth open end standpipe extending between a lower portion of said second chamber and a lower portion of said third standpipe and valve flow control means in each of said standpipes.

* * * * *